No. 667,063. Patented Jan. 29, 1901.
A. J. CLEVENGER.
ADJUSTABLE BALL BEARING AXLE.
(Application filed Feb. 14, 1900.)
(No Model.)

Witnesses:
L. C. Hills.
C. G. Cramwell.

Inventor:
A. J. Clevenger,
By Geo. B. Selden,
Atty.

UNITED STATES PATENT OFFICE.

ADDISON J. CLEVENGER, OF ONTARIO, NEW YORK.

ADJUSTABLE BALL-BEARING AXLE.

SPECIFICATION forming part of Letters Patent No. 667,063, dated January 29, 1901.

Application filed February 14, 1900. Serial No. 5,127. (No model.)

*To all whom it may concern:*

Be it known that I, ADDISON J. CLEVENGER, a citizen of the United States, residing at Ontario, in the county of Wayne, in the State of New York, have invented an Improved Adjustable Ball-Bearing Axle, of which the following is a specification, reference being had to the accompanying drawings.

My invention relates to an improvement in adjustable ball-bearing axles designed for use on bicycles, tricycles, motocycles, &c., but capable of being employed for many other purposes.

My improvement is fully described and illustrated in the following specification and the accompanying drawings, the novel features thereof being specified in the claim annexed to the said specification.

Figure 1:
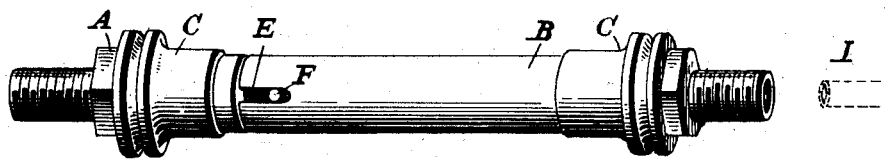
Figure 2:
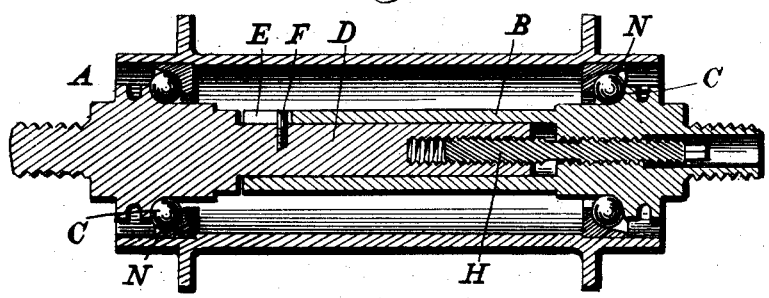
Figure 3:
Figure 4:
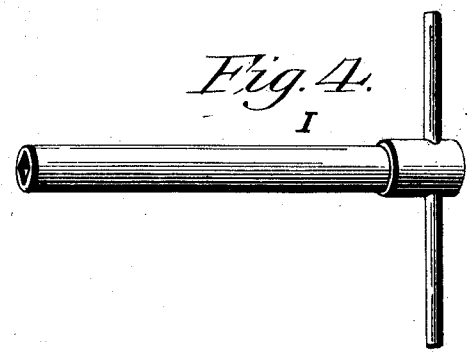

In the accompanying drawings, Figure 1 is an elevation. Fig. 2 is a central longitudinal section. Fig. 3 represents the differential screw. Fig. 4 is the key.

My improved adjustable ball-bearing axle consists of the two relatively movable members A and B, each of which is provided with a cone C, which bears against a ring of balls N, as indicated in Fig. 2. One of the members is provided with a cylindrical stem D, which fits inside the other member, being arranged to slide lengthwise therein. A slot E in the outer member receives a pin or screw F, inserted in the stem, so that the members are prevented from turning relatively to each other. The members are connected together by the differential screw H, which is rotated by the key I, inserted through a central opening in one of the members. The screw H is provided with two threads of different pitches, one, J, being of, say, twenty-four threads to the inch, while the other, K, is of, say, thirty-two threads to the inch, so that a very fine adjustment of the cones relatively to each other may be made by turning the screw.

My improved axle may be used in connection with any suitable hub or revolving part having cones or bearings for the balls.

The stem D of member A extends nearly the entire length of the tubular part of the member B, which tubular part has a length approximately equal to the distance between the cones, the purpose of the construction being to impart strength and stability to the joint. In prior constructions both members have had equal diameters and clutch connections at the ends, covered by an additional sleeve. The present improvement avoids the use of such sleeve and provides a stronger and more stable joint and adds to the strength of the axle as a whole independently of the particular form of the joint and provides for more easily fitting the two members in manufacture.

I claim—

The combination, with the divided axle, consisting of two relatively adjustable members one fitted within the other and each provided with cones, of the internal differential screw, and the spline and slot connection between the members, as and for the purposes set forth.

ADDISON J. CLEVENGER.

Witnesses:
GEO. B. SELDEN,
C. G. CRANNELL.